United States Patent [19]
Ryu

[11] Patent Number: 5,978,921
[45] Date of Patent: Nov. 2, 1999

[54] COMPUTER SYSTEM AND CONTROL METHOD THEREOF

[75] Inventor: Chang-Hyun Ryu, Seungnam, Rep. of Korea

[73] Assignee: Samsung Electronics Co., Ltd., Kyungki-do, Rep. of Korea

[21] Appl. No.: 08/941,613

[22] Filed: Sep. 30, 1997

[30] Foreign Application Priority Data

Sep. 30, 1996 [KR] Rep. of Korea ................... 96-43103

[51] Int. Cl.⁶ ................................................ G06F 1/32
[52] U.S. Cl. ..................... 713/300; 718/320; 718/324; 718/340
[58] Field of Search ................. 395/750.01–750.08; 364/492; 365/226–229; 713/300, 310, 320, 322, 323, 324, 330, 340

[56] References Cited

U.S. PATENT DOCUMENTS

| | | | |
|---|---|---|---|
| 4,907,183 | 3/1990 | Tanaka | 364/707 |
| 4,984,185 | 1/1991 | Saito | 364/707 |
| 5,412,307 | 5/1995 | Yoshimatsu | 320/44 |
| 5,412,809 | 5/1995 | Tam et al. | |
| 5,442,794 | 8/1995 | Wisor et al. | 395/750.08 |
| 5,483,464 | 1/1996 | Song. | |
| 5,493,670 | 2/1996 | Douglis et al. | |
| 5,546,589 | 8/1996 | Odaira | 395/750.08 |
| 5,555,032 | 9/1996 | Kung. | |
| 5,561,384 | 10/1996 | Reents et al. | |
| 5,581,453 | 12/1996 | Ueta et al. | |
| 5,586,333 | 12/1996 | Chol et al. | |

*Primary Examiner*—Ayaz R. Sheikh
*Assistant Examiner*—Ario Etienne
*Attorney, Agent, or Firm*—Robert E. Bushnell, Esq.

[57] ABSTRACT

A portable computer system made up of a voltage level detecting portion for detecting the output voltage level of a battery; a switching portion connected between the battery and at least one peripheral device for turning on/off the peripheral device; a battery charging state determining portion for receiving a voltage level signal from the voltage level detecting portions, comparing it with a reference voltage level between the normal operating voltage level and the lower voltage level that is relatively lower than the normal operating voltage level, determining the charging state of the battery and outputting a control signal; and a control portion for controlling the turning on or off of the switching portion in response to the control signal, thereby controlling a hard disk drive to store current data at the reference voltage level.

13 Claims, 8 Drawing Sheets

COMPUTER SYSTEM AND CONTROL METHOD THEREOF

CLAIM OF PRIORITY

This application makes reference to, incorporates the same herein, and claims all benefits accruing under 35 U.S.C. §119 from an application for A Computer System and Control Method Thereof earlier filed in the Korean Industrial Property Office on Sep. 30, 1996 and there duly assigned Ser. No. 43103/1996.

FIELD OF THE INVENTION

The invention is related to providing a computer system, and particularly, to providing a portable computer system and control method thereof for controlling a peripheral device such as a hard disk drive to save the power energy of a battery.

DESCRIPTION OF THE RELATED ART

There have been many disclosures related to saving power consumption of a battery for a laptop or portable computer. For example, U.S. Pat. No. 5,412,809 for a Disk Drive Power Control Circuit and Method to Tam et al discloses a circuit and method for controlling power consumption for a disk drive units in portable computers. In particular, the invention contains current versus access time tables in memory to reduce the unnecessary consumption of power so as to prolong the length of the life of the portable computer battery.

U.S. Pat. No 5,442,794 for a Disable Technique Employed During low Battery Conditions Within a Portable Computer System to Wisor et al discloses a computer system that prevents power from being applied to a primary portion of the computer system when the battery voltage falls below a threshold value. Despite these examples, I have not seen a system that adjusts the method of power consumption based on the output voltage of the battery.

SUMMARY OF THE INVENTION

It is an object to provide a peripheral to a notebook or laptop computer that operates at substantially a lower voltage than the battery supply voltage.

It is also an object to continuously monitor the supply battery voltage and to respond accordingly when the supply battery voltage falls below threshold voltages.

It is yet another object to operate the peripheral device at the supply battery voltage when the supply battery voltage falls below a first of two threshold voltages.

It is still another object to save the current state of the computer and to place the computer in hibernation mode when the supply battery voltage falls below a second threshold voltage which is lower than the first threshold voltage.

According to a first preferable embodiment of the invention, a control method of a portable computer system including at least one peripheral device and a battery for storing current data at a lower voltage level that is relatively lower than a voltage for the normal operation, is characterized in that the computer system forces the peripheral device to be activated at a reference voltage level between the normal operating level and the lower voltage level. The control method is characterized in that the portable control system controls a hard disk drive to store current data at the reference voltage level.

The portable computer system comprises a voltage level detecting means for detecting the output voltage level of the battery; a switching means connected between the battery and the peripheral device for turning on/off the peripheral device; a battery charging state determining means for receiving a voltage level signal from the voltage level detecting means, comparing it with a reference voltage level between the normal operating voltage level and the lower voltage level that is relatively lower than the normal operating voltage level, determining the charged state of the battery and outputting a control signal; and a control means for controlling the turning on or off of the switching means in response to the control signal.

According to a second preferable embodiment of the invention, a control method of a portable computer system including at least one peripheral device and a battery for storing current data at a first reference voltage level that is relatively lower than a voltage for the normal operation and a second reference voltage level that is relatively lower than the first reference voltage level, comprises steps of determining whether an external source is connected to the computer system and restoring the peripheral device into a power saving mode if the external source exists; detecting the output voltage level of the battery if the external source does not exist; determining whether the output voltage level of the battery is the normal operating voltage of the system and restoring the peripheral device into the power saving mode if the output voltage level is normal; determining whether the output voltage level reaches the first reference one, if the output voltage level of the battery is not the normal operating voltage of the system; detecting the output voltage level until it gets equal to the first reference one, if the output voltage level does not reach the first reference ore; and generating a control signal and activating the peripheral device if the output voltage level is equal to the first reference one.

Furthermore, the control method comprises steps of detecting the output voltage level of the battery; detecting the output voltage level until it gets equal to the second reference one, if the first reference voltage level does not reach the second reference one; and storing the current state of the computer system and turning off the power source.

According to a third preferable embodiment of the invention, a control method of a portable computer system including at least one peripheral device and a battery for storing current data at a first reference voltage level that is relatively lower than a voltage for the normal operation and a second reference voltage level that is relatively lower than the first reference voltage level, comprises steps of determining whether an external source is connected to the computer system and restoring the peripheral device into a power saving mode if the external source exists; detecting the output voltage level of the battery if the external source does not exist; determining whether the output voltage level of the battery is the normal operating voltage of the system and restoring the peripheral device into the power saving mode if the output voltage level is normal; determining whether the output voltage level reaches the first reference one, if the output voltage level of the battery is not the normal operating voltage of the system; detecting the output voltage level until it gets equal to the first reference one, if the output voltage level does not reach the first reference one; generating a control signal and activating the peripheral device if the output voltage level is equal to the first reference one; detecting the output voltage level of the battery; detecting the output voltage level until it gets equal to the second reference one, if the first reference voltage level does not reach the second reference one; and storing the current state of the computer system and turning off the power source.

Therefore, the invention can prevent the steep increasing of an amount of the power energy to be used at the second low battery voltage level and the loss of users' information and data due to the turning off of the power source before storing the current state and extend the operating time of the computer system by means of the battery.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
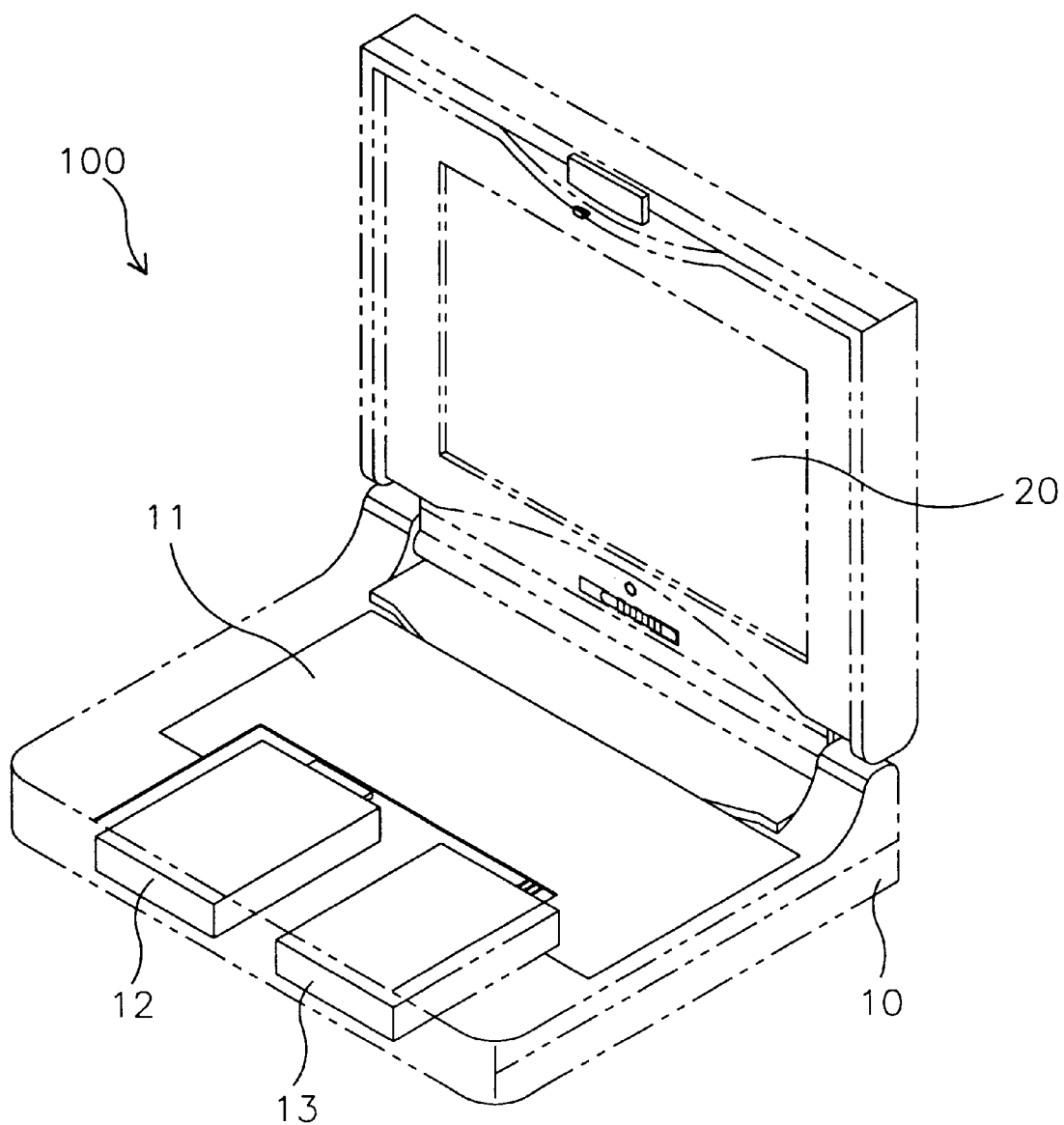
FIG. 1 is a schematic perspective view illustrating the total aspect of a portable computer system.

Turning to the figures, FIG. 1 is a schematic perspective view illustrating the total aspect of a portable computer system operated by a battery. The computer system comprises a main body 10 including a main board 11 mounted therein and for computing data, performing programming and controlling a system, a display 20 for displaying all information related to the operation thereof, a hard disk drive 12 (sometimes called "HDD" below) contain a system operating programing and other application programing and softwares, various data, etc., and a battery 13 supplying its power to operate the system. A CD-ROM drive (not shown) also may be mounted in the computer system in order to enable users to access to new data or other programming, if necessary.

Figure 2:
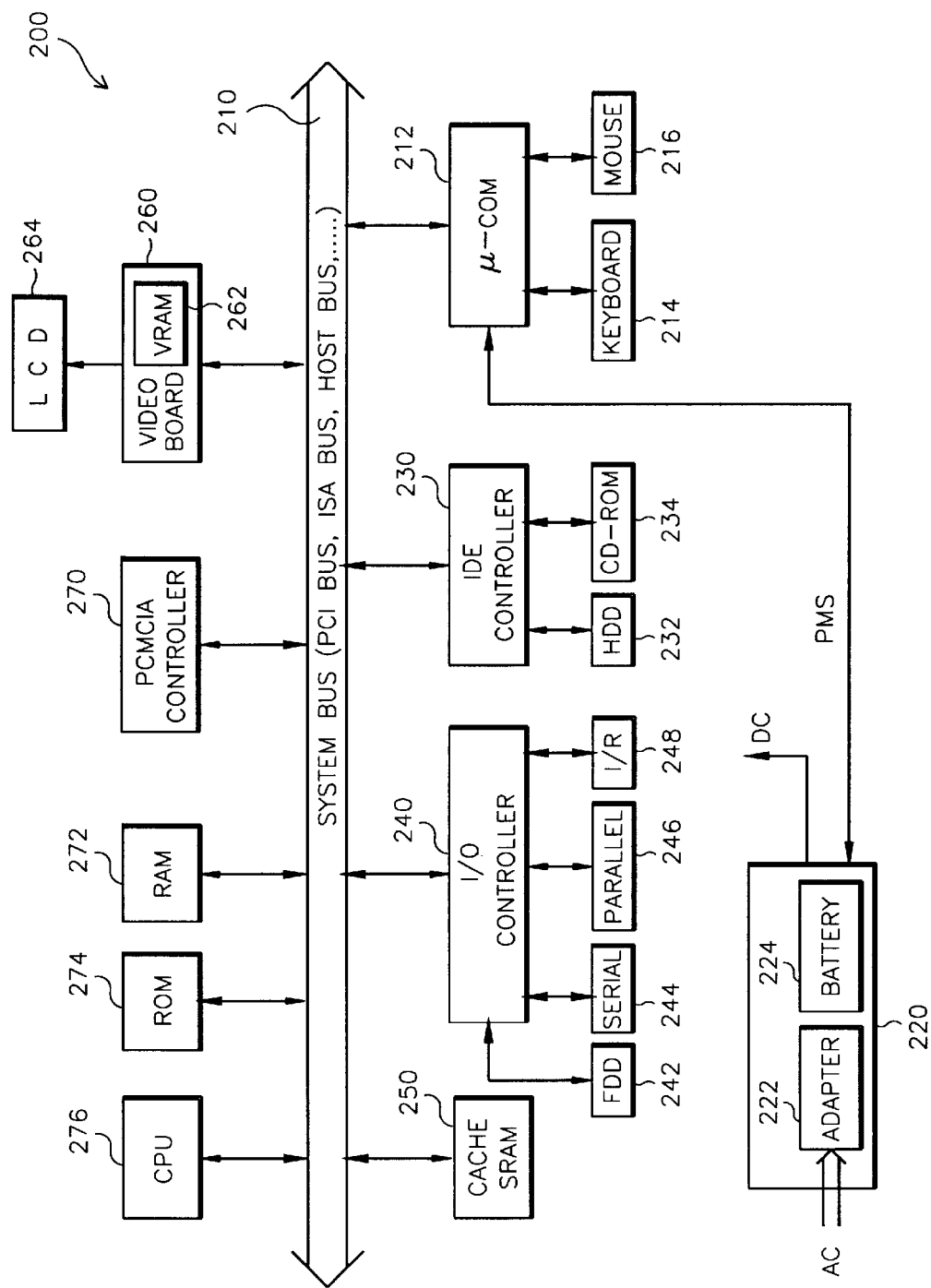
FIG. 2 is a schematic block diagram illustrating an inner configuration of the computer system.

Referring to FIG. 2 schematically illustrating a block diagram of the computer system, the portable computer system generally comprises system buses 210, for example a peripheral component interconnect (PCI) bus, an industry standard architecture (ISA) bus, etc., for interfacing various signals and data to target components in order to compute data, perform programming and control a system, an input-output (I/O) controller 240 for controlling various ports, for example a serial port 244, a parallel port 246, an infrared (I/R) ports, etc., and a floppy disk drive (FDD) 232, an integrated device electronics (IDE) controller 230 for controlling a hard disk drive (HDD) 232 and a CD-ROM drive 234, a personal computer memory card international association (PCMCIA) 270, a static random access memory (SRAM) 250, a read only memory (ROM) 272 and a random access memory (RAM) 272 constituted as inner storing components, a central processing unit (CPU) 276 and a microcomputer 212 for controlling a keyboard 214 and a mouse 216 inputting data and control parameters for controlling the operation of the system; and a power supplying portion 220 including an adaptor 222 electrically connected to an outer power source and a battery 224.

Figure 3:
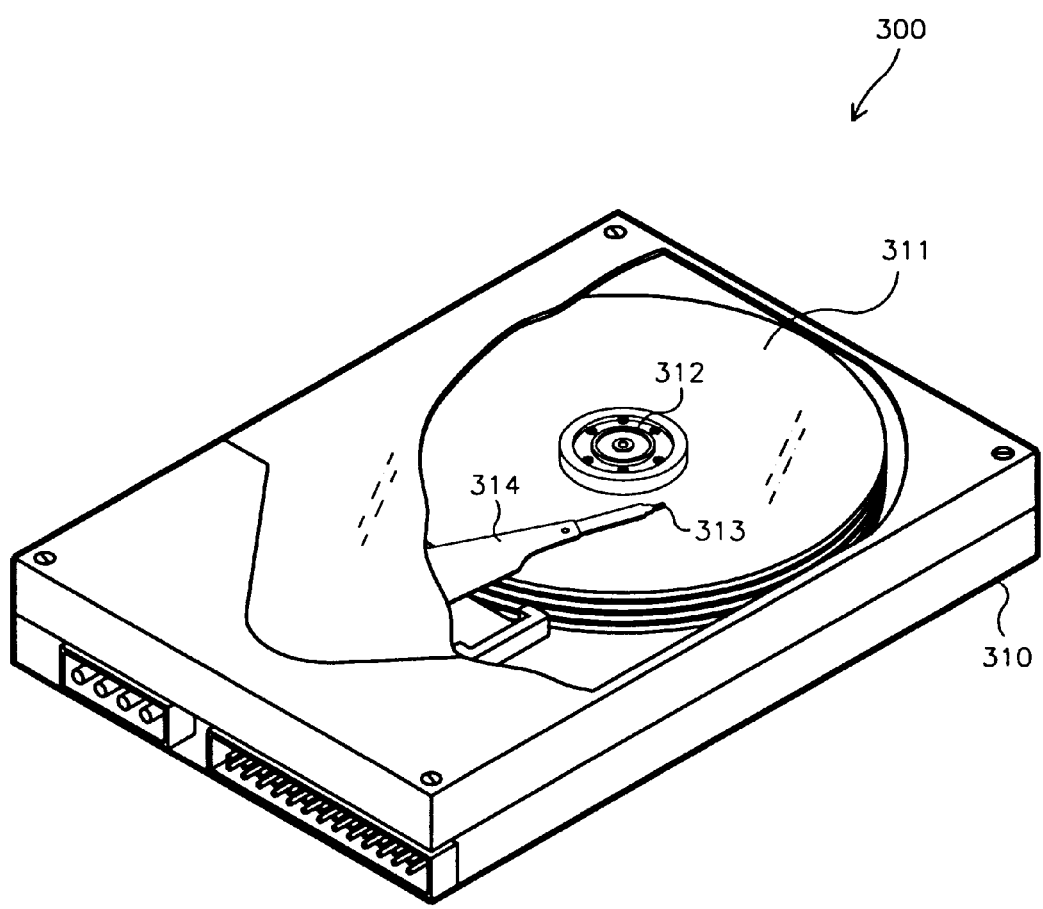
FIG. 3 is a perspective view illustrating a schematic inner configuration of a hard disk drive for being adapted to a computer system of the invention.

Referring to FIG. 3 illustrating a schematic inner configuration of a normal hard disk drive for being adapted to a computer system of the invention, the hard disk drive 300 includes a body 310, a disk 311 containing data, a spindle motor 312 for rotating the disk 311 and a head 313 coupled with an actuator 314, which is mounted in the HDD body 310, and for reading data therefrom or writing data thereon during the data accessing. And, a control circuit portion including a controller is provided in the body 310 to control a power source supplied thereto and the operation of the HDD, which is not shown.

The portable computer system is activated by a commercial power source (AC 110–220 Volts) using the adaptor or the battery, but only the battery operated computer system will be described below.

The battery activated portable computer system is limited to its use time. In that case, it is important to extend the use time of the battery. Also, it is very important to determine whether the charged battery voltage is a first low battery voltage level relatively lower than the normal operating voltage level or a second low battery voltage level lower than the first low battery voltage level. If the portable computer system is used with the battery, it causes the loss of user's information and data due to the power-off followed by the discharging of the battery under the situation that information being used and data newly generated is not memorized.

In order to resolve these problems, the normal portable computer system is set at many system modes to decrease the power consumption of the battery. The computer system provides functions to automatically store data being used and then turn off the system in order to prevent the loss of data due to the dropping of the battery voltage level. In other words, the power system modes are set to decrease the power consumption of the battery as indicated in tables 1 and 2.

TABLE 1

The computer system forces components to be activated according to the power save mode as follows:

| Mode | HDD Portion | LCD Portion | CPU | Main System |
|---|---|---|---|---|
| NORMAL | ON | ON | ON | ON |
| SYSTEM STANDBY | STANDBY | OFF | STOP CLOCK | ON |
| HDD STANDBY | STANDBY | ON | Don't Care | ON |
| SUSPEND RAM | OFF | OFF | OFF | ON |
| POWER-OFF | OFF | OFF | OFF | OFF |

TABLE 2

The hard disk drive system forces components to be activated according to the power save mode as follows:

| Mode | Mechanism portion (Actuator Portion) | System Portion (Circuit Portion) |
|---|---|---|
| ON | ON | ON |
| STANDBY | OFF | ON |
| POWER-OFF | OFF | OFF |

Referring to Tables 1 and 2, it is known that the major components of the computer system and the hard disk drive system are set at different operating modes, respectively, to decrease the power consumption. Especially, the hard disk drive system is maintained at the standby mode cutting off the power supplied to the mechanism including the spindle motor 312 and the actuator 314, but the control circuit portion thereof including a controller is maintained at the ON mode.

Figure 4A:
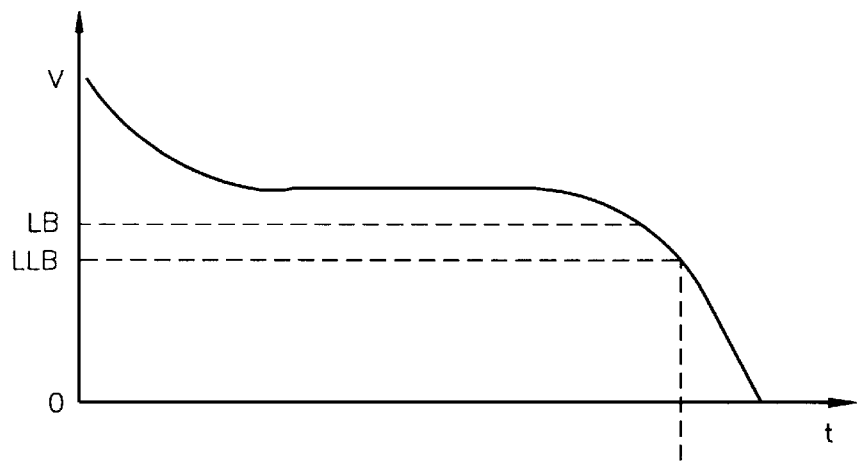
FIG. 4A is a graph illustrating the output level change of a battery based on the using time of the computer system.

The computer system also performs the hibernation function to prevent the loss of data being used, when the battery voltage level becomes lower due to the long time use of the battery. The hibernation function now will be explained referring to FIG. 4A to FIG. 4C. Only, the hard disk drive 300 is set at the standby mode.

Figure 4B:
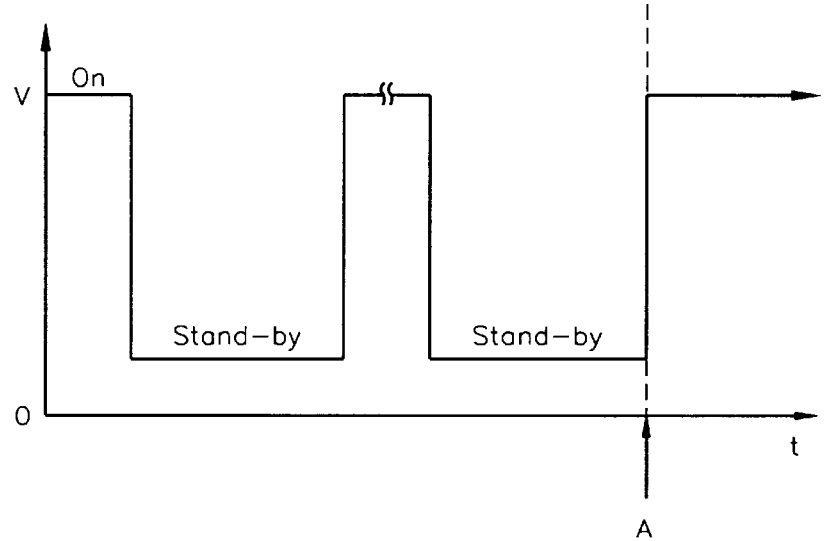
FIG. 4B is a graph illustrating the driving voltage level of the HDD.
Figure 4C:
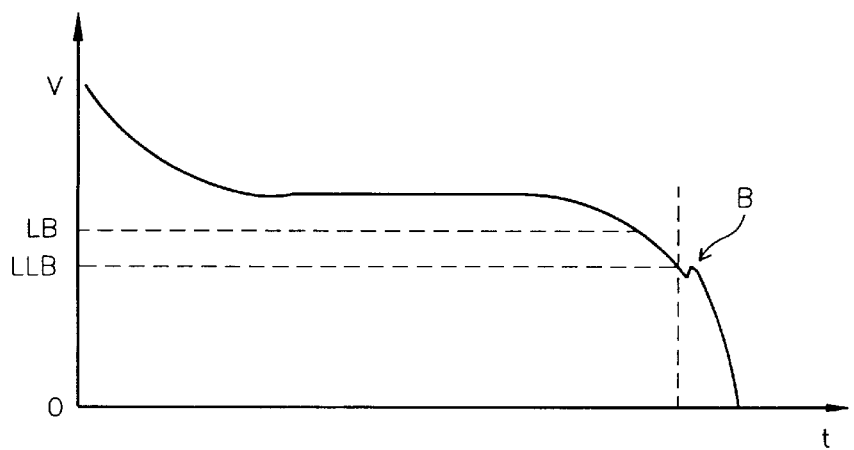
FIG. 4C is a timing diagram showing the output level change of a battery based on the using time of the computer system.

As the output voltage level of the battery becomes a first low battery voltage level according to the long time use, the mechanism portion including the spindle motor 312 and the actuator 314 is set at the standby mode cutting off the power as shown in FIG. 4B. Thereafter, when the first low battery voltage level (LB) becomes the second low battery voltage level (LLB) relatively lower over it, the microcomputer 212 detects the LLB of the battery output voltage level and generates a system management interrupt (SMI) commanding the hibernation function. In response to the command of the SMI, the CPU 276 forces the power source to be supplied to the spindle motor 312 and the actuator 314. At that time, the hard disk drive 300 is activated to enable the computer system to store information and data at the hard disk 311 and then to turn off the power source, thereby preventing the loss of data.

But, if the computer system performs the hibernation function of activating the hard disk drive at the second low battery voltage level, storing current information and data and then turning off the power source, the amount of the power energy is abruptly increased according to the operating of the mechanism portion. It means that the computer system must use the relatively higher voltage level over the second low battery voltage level that the power energy is corresponding to the output voltage level of the battery. Due to it, the system power source is cut off, and the computer system is shut down, thereby resulting in the loss of the user's information data.

In order to remove these advantages, an object of the invention is to provide a computer system and a control method thereof for controlling a hard disk drive to save the power energy of a battery.

Figure 5:
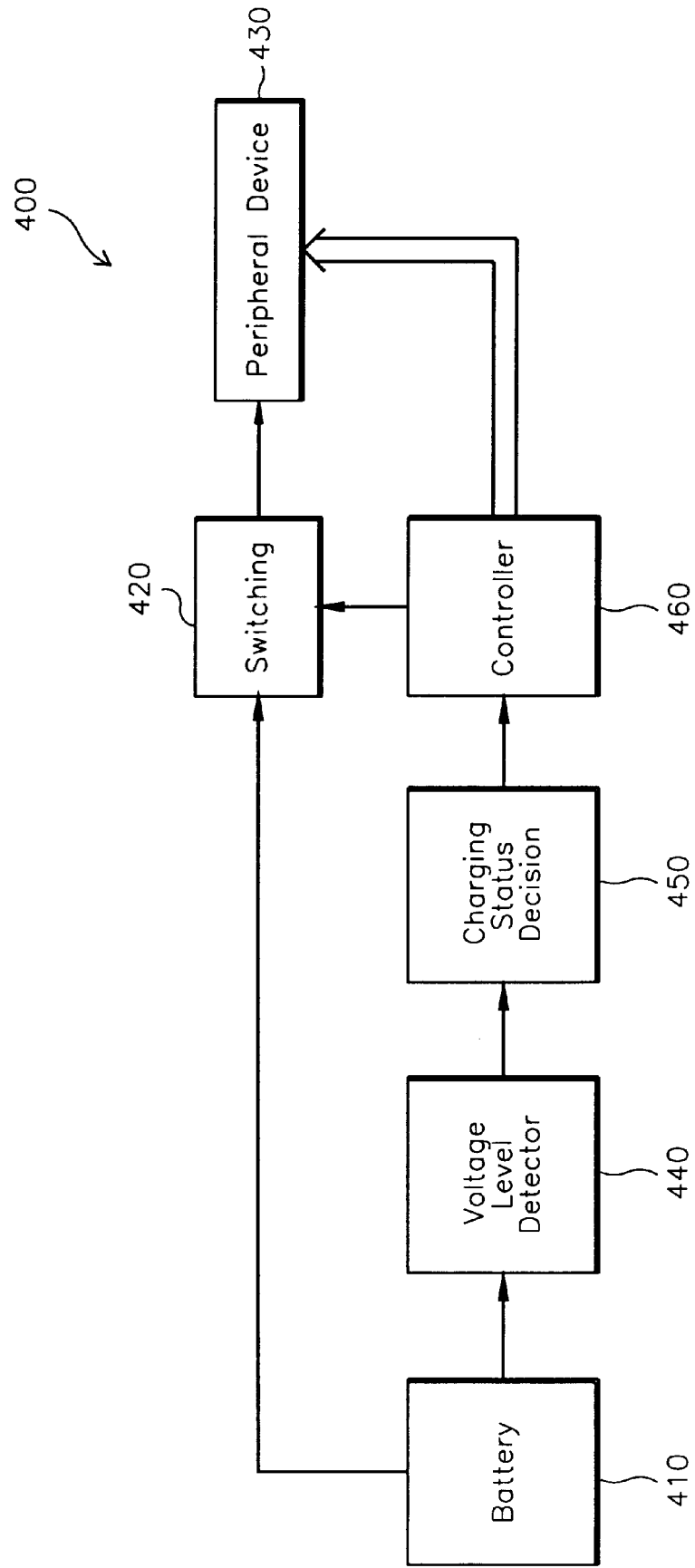
FIG. 5 is a schematic block diagram illustrating the configuration of the computer system according to the invention.

Referring to FIG. 5, a portable computer system comprises a battery 410 for supplying the power source to operate the system and at least one peripheral device 430. A voltage levd detecting portion 440 is connected to the battery 410 to detect the output voltage level therefrom. The switching portion 420 is provided between the battery 410 and the peripheral device 430 to turn on/off the peripheral device. A battery charging state determining portion 450 is connected to the voltage level detecting portion 440 to receive a voltage level signal therefrom, compare the received voltage level with a reference voltage level between the normal operating voltage level and a lower voltage level that is relatively lower than the normal operating voltage level, determine the charging state of the battery 410 and output an interrupt signal (SMI). A control portion 460 is connected to the switching portion 420 to control the turning on or off of the switching portion 420 in response to the control signal (SMI). Herein, it is noted that the peripheral device is a peripheral one such as a hard disk drive or a CD ROM drive.

Figure 6:
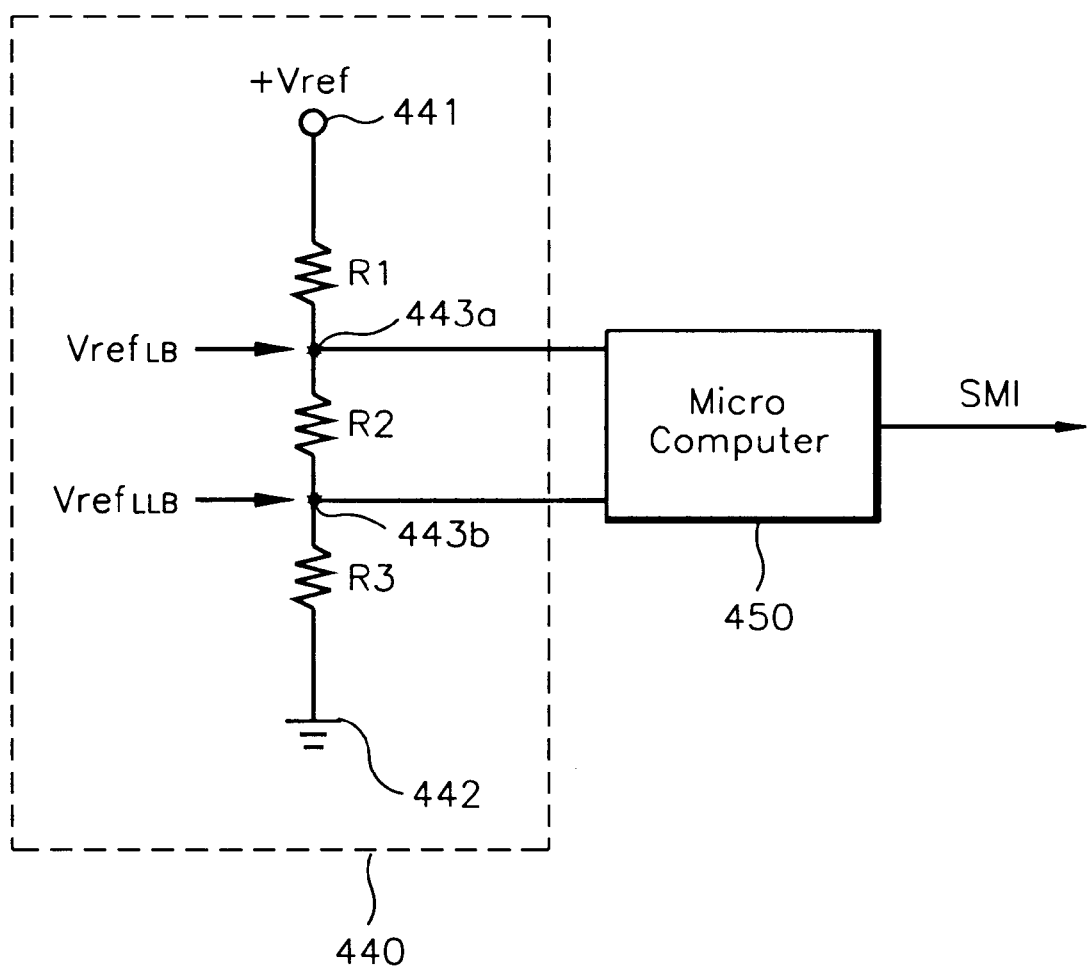
FIG. 6 is a detailed view illustrating a voltage level detecting portion of the computer system according to the invention.

FIG. 6 shows a detailed circuit of the voltage level detecting portion 440. As shown in FIG. 6, the voltage level detecting portion 440 includes a voltage terminal 441 and a ground terminal 442 respectively connected to both polarities of the battery 410. First, second and third resistors R1, R2, R3 are arranged in turn between the voltage terminal 441 and the ground terminal 442. First node 443a is formed between the first and second resistors R1, R2 and second node 443b is formed between the second and third nodes R2, R3. The first and second nodes 443a, 443b each is connected to the input port of the battery charging state determining portion 450 constituted as microprocessor. Therefore, the first node 443a is considered as a first reference voltage level VrefLB indicating a first low battery voltage level, and the second node 443b is subject to be a second reference voltage levd VrefLLB representing a second low battery voltage level lower than the first low battery voltage level.

Figure 7A:
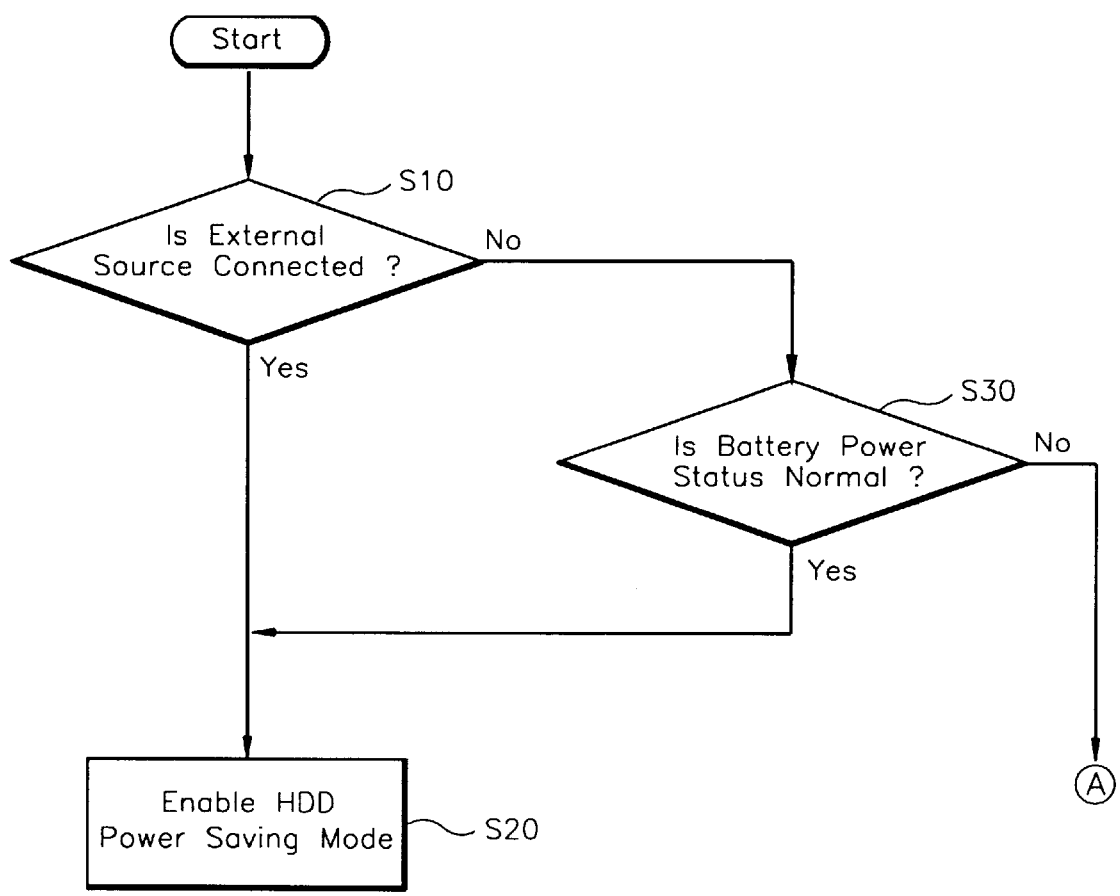
FIGS. 7A and 7B are a flow chart illustrating the operation of the computer system according to the invention.
Figure 7B:
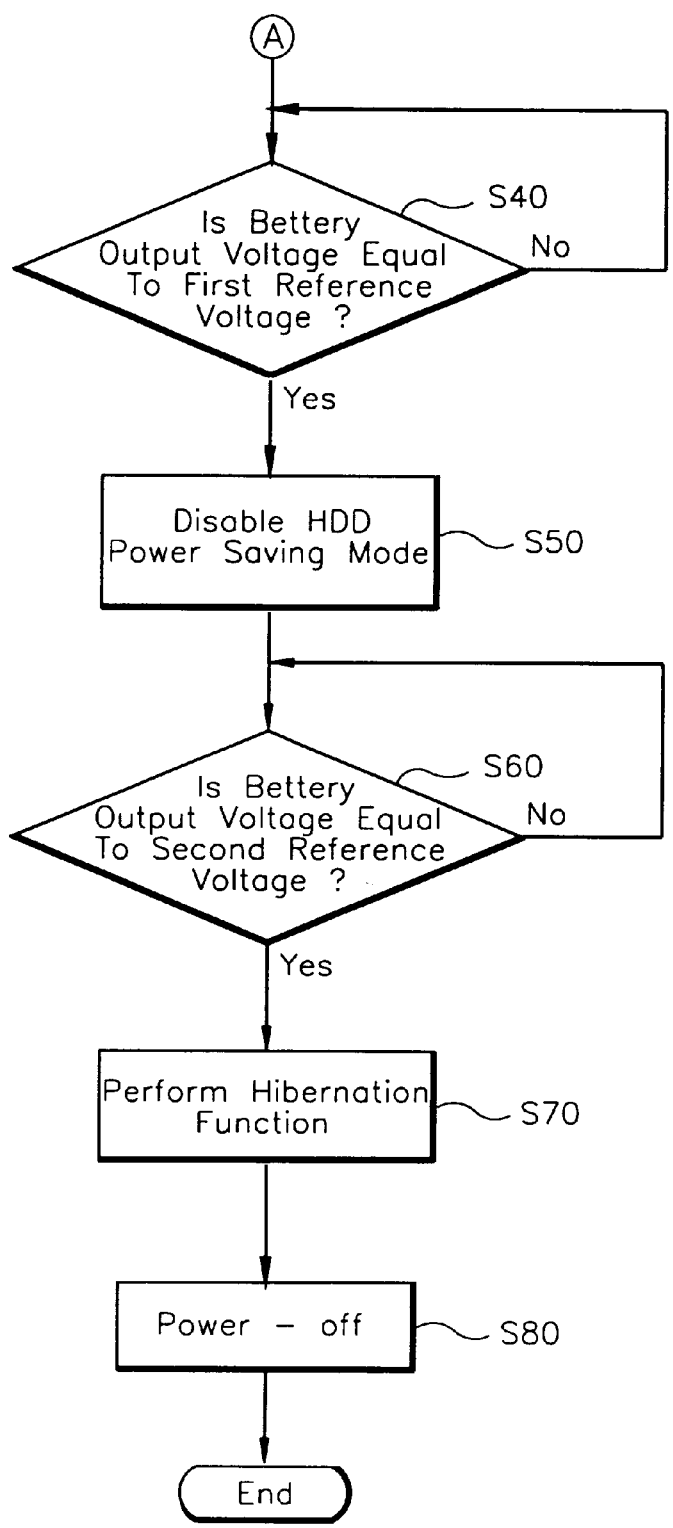

The computer system is operated as shown in FIGS. 7A and 7B, but in that case the peripheral device 430 is a hard disk drive not limited thereto. A method that the computer system controls the peripheral device thereof is as follows.

The portable computer system 400 first performs the procedure of determining whether an external power source is connected thereto at step S10. A power saving mode of the peripheral device 430 is enabled at step S20, if the external source exists. The output voltage level of the battery 410 is detected, if the external source does not exist, and then it is determined at step S30 whether the output voltage level of the battery 410 is the normal operating voltage of the system. The power saving mode of the peripheral device 430 is enabled like step S30, if the output voltage level is normal. It is determined at step S40 whether the output voltage level is equal to the first reference voltage VrefLB, when the output voltage level of the battery 410 is not the normal operating voltage of the system. The output voltage level is continuously detected until it gets equal to the first reference voltage, if the output voltage level does not reach the first reference voltage VrefLB.

Next, the power saving mode of the peripheral device 430 is disabled and again the power voltage of the battery 410 is applied to the peripheral device at step S50, if the output voltage level is equal to the first reference voltage VrefLB. Then, the output voltage level of the battery is detected at step 40 until it gets equal to the first reference voltage VrefLB, if the battery voltage level is not equal to the first reference voltage VrefLB. Thereafter, step S50 is performed and the output voltage level of the battery 410 is detected. It is determined at step S60 whether the output voltage level is equal to the second reference voltage VrefLLB.

The computer system 400 stores current information and data being used into the peripheral device 410 at step S70, if the output voltage level of the battery is equal to the second reference voltage VrefLLB. On the contrary, the output voltage level of the battery is detected until it gets equal to the second reference voltage VrefLLB at step S60, if the output voltage level is not equal to the second reference voltage VrefLLB. After performing step S70, the computer system stores current information and data and turns off itself As described above, the invention resolves problems as follows; the amount of the power energy of the computer system to be used is relatively higher than that of the battery, if the computer system activates a peripheral device and stores current data when the output voltage level of the battery is the second low battery voltage level. Due to it, the system power source is cut off, and the computer system is shut down, thereby resulting from the loss of the user's information and data.

On the contrary, according to the invention, a portable computer system first activates a peripheral device when the output voltage level is the first low battery voltage level higher than the second low battery voltage level. Also the portable computer system stores current states when the output voltage level is the second low battery voltage level. Therefore, the invention can prevent the steep increasing of an amount of the power energy to be used at the second low battery voltage level and the loss of users' information and data due to the turning off of the power source before storing the current state and extend the operating time of the computer system by means of the battery.

What is claimed is:

1. A control method of a portable computer system, comprising the steps of:
   providing at least one peripheral device having a power saving mode;
   providing a battery operating said portable computer system;
   comparing an output voltage of the battery to a reference voltage level between a normal operating level and a lower voltage level; and
   disabling said power saving mode of the peripheral device when said comparing step determines that said output voltage is equal to the reference voltage level.

2. The control method of the portable computer system as claimed in claim 1, further comprising the steps of:
   determining when said output voltage of said battery is equal to said lower voltage level; and
   controlling the peripheral device to store current data and turn off said peripheral device when the battery output voltage equals the lower voltage level.

3. The control method of the portable computer system as claimed in claim 1, wherein the peripheral device is a hard disk drive.

4. A portable computer system comprising:
   a voltage level detecting means for detecting the output voltage level of a battery;
   a switching means connected between the battery and a peripheral device for enabling and disabling a power saving mode of the peripheral device;
   battery charging state determining means for receiving a voltage level signal from the voltage level detecting means, comparing it with a reference voltage level between the normal operating voltage level and the lower voltage level that is relatively lower than the normal operating voltage level, determining the charging state of the battery and outputting a control signal; and
   control means for controlling the turning on or off of the switching means in response to the control signal allowing said switching means to disable said power saving mode of said peripheral device when the output voltage level of the battery drops to said reference voltage level.

5. The portable computer system as claimed in claim 4, wherein the peripheral device is a hard disk drive.

6. A control method of a portable computer system, comprising steps of:
   providing at least one peripheral device having a power saving mode;
   providing a battery operating said portable computer system;
   enabling said power saving mode upon turning on said portable computer while an output voltage of said battery is at a normal operating voltage level;
   detecting an output voltage level of the battery until the output voltage level gets equal to a reference voltage between the normal operating voltage level and a lower voltage level; and
   disabling said power saving mode of the peripheral device at the reference voltage level.

7. The control method of the portable computer system as claimed in claim 6, wherein the control method furthermore comprises step of detecting the output voltage level of the battery and storing current data and turning off the system when the output voltage level becomes equal to the lower voltage level.

8. The control method of the portable computer system as claimed in claim 6, wherein the peripheral apparatus is a hard disk drive.

9. A control method of a portable computer system, said method comprising the steps of:
   providing at least one peripheral device having a power saving mode;
   providing a battery operating said portable computer system;
   determining whether an external source is connected to the computer system and enabling said power saving mode of the peripheral device when the external source exists;
   detecting an output voltage level of the battery when the external source does not exist;
   determining whether the output voltage level of the battery is the normal operating voltage of the system and enabling the power saving mode of the peripheral device when the output voltage level is normal;
   determining whether the output voltage level reaches the first reference voltage that is relatively lower than the voltage for the normal operation and higher than a second reference voltage;
   monitoring the output voltage level until it gets equal to the first reference voltage; and
   disabling the power saving mode of the peripheral device and activating the peripheral device if the output voltage level is equal to the first reference voltage.

10. The control method of the portable computer system as claimed in claim 9, further comprising the steps of:
    detecting the output voltage level of the battery;
    monitoring the output voltage level until it gets equal to the second reference voltage; and
    storing the current state of the computer system and turning off the power source when the battery is outputting a voltage equal to said second reference voltage.

11. The control method of the portable computer system as claimed in claim 9, wherein the peripheral apparatus is a hard disk drive.

12. A control method of a portable computer system, said method comprising the steps of:

provesiding at least one peripheral device having a power saving mode;

providing a battery operating said portable computer system;

determining whether an external source is connected to the computer system and restoring the peripheral device into a power saving mode when the external source exists;

detecting an output voltage level of the battery when the external source does not exist;

determining whether the output voltage level of the battery is the normal operating voltage of the system and restoring the peripheral device into the power saving mode when the output voltage level is normal;

determining whether the output voltage level reaches the first reference voltage that is relatively lower than a voltage for the normal operation and higher than a second reference voltage, when the output voltage level of the battery is not the normal operating voltage of the system;

detecting the output voltage level until it gets equal to the first reference voltage, when the output voltage level does not reach the first reference one;

generating a control signal to deactivate said power saving mode and hence activate the peripheral device when the output voltage level is equal to the first reference voltage;

monitoring the output voltage level until it gets equal to the second reference voltage; and storing the current state of the computer system and turning off the power source when the output voltage level of the battery reaches the second reference voltage.

13. The control method of the portable computer system as claimed in claim 12, wherein the peripheral device is a hard disk drive.

* * * * *